(No Model.)
C. F. SLEEPER.
PICTURE FRAME HANGER.
No. 285,517. Patented Sept. 25, 1883.
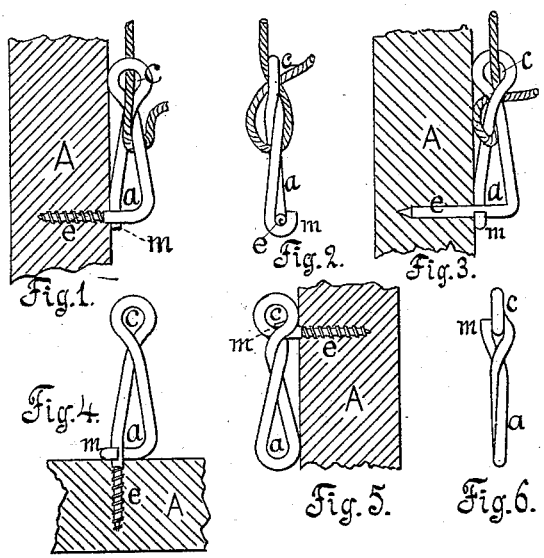
Witnesses.
John R. Snow.
M. R. Maynadier
Inventor,
Chas. F. Sleeper.

UNITED STATES PATENT OFFICE.

CHARLES F. SLEEPER, OF BOSTON, ASSIGNOR TO TATE & CO., OF MALDEN, MASSACHUSETTS.

PICTURE-FRAME HANGER.

SPECIFICATION forming part of Letters Patent No. 285,517, dated September 25, 1883.

Application filed July 18, 1883. (No model.)

*To all whom it may concern:*

Be it known that I, CHARLES FREDERIC SLEEPER, a citizen of the United States, residing at Boston, in the county of Suffolk and State of Massachusetts, have invented a new and useful Improvement in Picture-Frame Hangers, of which the following is specification.

My invention relates to improvements in the attachments to picture and other frames by which such frames are suspended, and is intended to replace the screw-eyes commonly used for that purpose. It does away with the necessity of knotting the picture-cord, and holds the cord securely in such a manner that its length can be readily adjusted to raise or lower the frame without tying or untying a knot. My device for this purpose consists of a wire so formed that one end can be screwed or driven into the frame while the other portion is properly looped for the reception of the cord. I have shown in each figure of the drawings two loops, one of which, *a*, is large at its lower end and crotched at the upper, and on the jamming of the cord into the crotch of this loop I rely for the suspension of the weight. For further security I form a loop or eye, *c*, above the loop *a*, through which to pass the cord before it enters the loop.

Figure 1 shows the cord passed through the eye *c* and loop *a* and turned up. If the cord is of a material like braided wire, it will jam and hold its place firmly; but I prefer, especially if the cord is made of some softer material, to pass the loose end back through the eye *c*, as shown in Fig. 2, or behind the holder, as in Fig. 3, or in some sufficient way keep it above the crotch of the loop. When the cord is relieved from the weight of the frame, it is easily released from the hanger and its position adjusted. The ends *e* are made to screw into the frame A, as shown in Figs. 1, 3, and 5, or to be driven in, as shown in Fig. 3. The ends *m* are made plain, as shown in Figs. 1, 5, and 6, or bent around the ends *e*, as shown in Figs. 2, 3, and 4. Fig. 4 shows an arrangement of the hanger adapted to frames which are hung from the top, and Figs. 5 and 6 show an arrangement where the eye *c* is above and the loop *a* below the screw end *e*.

I do not confine myself to the use of round wire, as I may use other forms—such, for instance, as square or hexagonal—to better jam and hold the cord; and I may form the screw upon the end *e* by twisting such wire, instead of cutting a thread, as shown in the drawings.

What I claim as my invention is—

1. A picture-frame hanger consisting of a rigidly-crotched loop, *a*, for jamming and holding the cord, and a supporting end, *e*, substantially as shown and described.

2. In combination with the rigidly-crotched loop *a* and supporting end *e*, the eye *c* above the loop *a*, substantially as shown and described.

3. A picture-frame hanger formed of a single piece of wire and embodying a shank, *e*, eye *c*, and loop *a*, one arm of which crosses the other and is interlocked to confine the end thereof, substantially as shown.

CHAS. F. SLEEPER.

Witnesses:
ALBERT W. BROWN,
EDWIN W. BROWN.